United States Patent
Chaney et al.

[11] 3,740,151
[45] June 19, 1973

[54] ANALYZER EMPLOYING MAGNETO-OPTIC ROTATION

[75] Inventors: Robert L. Chaney, Cupertino; Michael A. Kelly, Mountain View, both of Calif.

[73] Assignee: Hewlett-Packard Company, Palo Alto, Calif.

[22] Filed: Aug. 2, 1971

[21] Appl. No.: 168,332

[52] U.S. Cl. ................ 356/117, 350/151, 250/225
[51] Int. Cl. ........................................ G01n 21/40
[58] Field of Search ................. 250/225; 350/151; 356/116, 117

[56] References Cited
UNITED STATES PATENTS
3,312,141   4/1967   Cary .................................. 356/117
3,545,867   12/1970  Rostas ............................... 356/114

OTHER PUBLICATIONS
Forsythe et al., Applied Optics, 4/67, Vol. 6, No. 4, pp. 699–702.

*Primary Examiner*—Ronald L. Wibert
*Assistant Examiner*—Paul K. Godwin
*Attorney*—Roland I. Griffin

[57] ABSTRACT

A light beam of linearly polarized light is passed through a sample of material to be analyzed to a detector. A magnetic field is applied to the sample to obtain magneto-optic rotation of the polarization of the light by magneto-optically active constituents of the sample. A reference polarization rotator is positioned in the light beam to impart a reference rotation to the polarization of the light. One or both of the polarization rotation effects produced by the sample and the reference are modulated to produce a sideband modulation signal component in the detected output. The sideband signal component is separated and measured to obtain a signal having an amplitude which is a linear function of the quantity of the magneto-optically active material in the sample under analysis. In a preferred embodiment the reference polarization rotator comprises a second magneto-optic cell containing a reference magneto-optically active material corresponding to one of the constituents within the sample under analysis, whereby increased specificity is obtained in the output measurement.

17 Claims, 6 Drawing Figures

ANALYZER EMPLOYING MAGNETO-OPTIC ROTATION

DESCRIPTION OF THE PRIOR ART

Heretofore, a linearly polarized light beam has been passed through a sample cell containing gas under analysis immersed in a magnetic field to produce magneto-optic rotation of the light beam from the first polarization to a second polarization. A crossed linear polarizer was provided for analyzing the polarization of the light after passage through the sample cell to separate the magneto-optically rotated light spectrum from the light beam. A photomultiplier was provided for detecting the magneto-optic rotation spectrum to produce an electrical signal. The magnetic field applied to the sample cell was modulated to produce a modulation of the detected magneto-optic rotation signal. The modulation component was synchronously detected against a harmonic sample of the modulation signal to produce an output which was a measure of the quantity of the magneto-optically active material within the sample under analysis. Such a magneto-optic rotation analyzer is disclosed and claimed in co-pending U.S. Application Ser. No. 162,602, filed July 14, 1971 and assigned to the same assignee as the present invention.

In another prior art magneto-optic rotation analyzer, substantially the same as that previously described, the performance has been improved by the addition of a reference polarization rotation modulator disposed in the optical beam path and modulated at a certain reference modulation frequency to produce a reference modulation signal component in the output of the detector. The reference signal has an amplitude independent of the magneto-optic rotation within the sample cell and is separated from the composite electrical signal and utilized for compensating the measured magneto-optic rotation signal component for fluctuations in the transmission characteristics of the elements within the analyzer. The result is a more accurate measurement of the quantity of the sample constituent under analysis. Such a prior analyzer is disclosed in co-pending U.S. Patent Application Ser. No. 161,846, filed July 12, 1971 and assigned to the same assignee as the present invention.

In both of the prior art magneto-optic rotation analyzers, the second harmonic of the signal modulation frequency was utilized as a time base for phase sensitive or synchronously detecting the magneto-optic rotation signal produced by the sample under analysis to derive an output which was integrated and measured to obtain a measure of the quantity of the constiuent of the sample under analysis. The problem with this method of measurement is that the detected signal component, at twice modulation frequency, is not linearly related with the quantity of the sample constituent under analysis. Thus, calibration of the system is difficult to obtain a true measure of the quantity of the unknown gas. Accordingly, it is desirable to obtain an electrical output signal which is linearly related to the quantity of the magneto-optic active constituent of the sample under analysis.

SUMMARY OF THE PRESENT INVENTION

The principal object of the present invention is the provision of an improved analyzer employing magneto-optic rotation.

One feature of the present invention is the provision of both a sample and reference rotation of the polarization of the probing beam and modulation of at least one of the rotations of polarization at a modulation frequency to produce an electrical signal component of a frequency corresponding to at least one sideband of the sample polarization rotation frequency and the reference polarization rotation frequency. The amplitude of the sideband signal is measured to obtain a measure of the quantity of material in the sample which is magneto-optically active within the band of optical frequencies of light detected by the detector, whereby the measured sideband output signal is linearly related to the quantity of material within the sample under analysis.

In another feature of the present invention the sideband electrical signal component, to be measured, is synchronously detected against a reference corresponding to the sideband of the reference and sample modulation frequencies.

In another feature of the present invention, a reference polarization rotation of the probing light beam is obtained by passing the linearly polarized probing beam through a magneto-optically active reference medium, which is the same as one of the sample constituents within the sample under analysis, and applying a magnetic field to the reference medium to obtain a reference magneto-optic rotation of the polarization probing light beam, whereby increased specificity is obtained in the electrical output signal.

In another feature of the present invention, the reference polarization rotator comprises a plurality of magneto-optically active reference mediums in the beam path of the probing light beam each of such reference mediums corresponding to a respective one of the sample constituents to be analyzed.

In another feature of the present invention, the reference polarization rotator includes a plurality of magneto-optic reference mediums each corresponding to a different one of the sample constituents to be analyzed, such reference mediums being separate and successively disposed along the probing light beam path with means for separately modulating each of the magneto-optic rotation effects of the respective reference mediums.

Other features and advantages of the present invention will become apparent upon a perusal of the following specification taken in connection with the accompanying drawings, wherein:

DESCRIPTION OF THE PREFERRED EMBODIMENTS

Figures 1, 2:
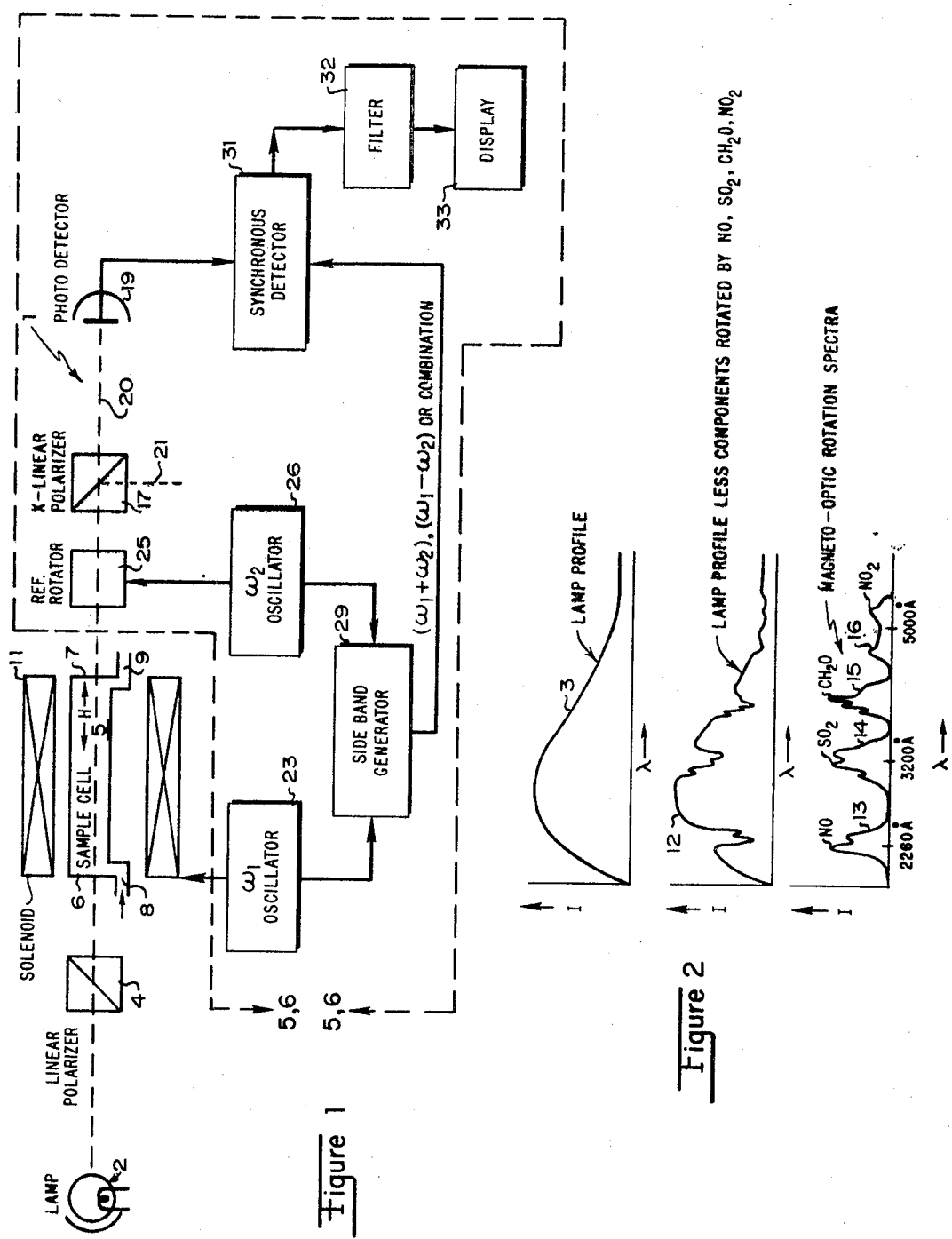
FIG. 1 is a schematic line diagram, partly in block diagram form, depicting a magneto-optic rotation analyzer employing features of the present invention.
FIG. 2 is a plot of light intensity v. wave length depicting the lamp profile, lamp profile less components rotated by certain sample constituents, and magneto-optic rotations spectra for the sample constituents, respectively.

Referring now to FIG. 1 and FIG. 2, there is shown the magneto-optic rotation analyzer 1 incorporating features of the present invention. The analyzer 1 includes a light source or lamp 2, such as a deuterium lamp, producing ultraviolet radiation having a spectral profile of intensity I v. wavelength ($\lambda$) as shown by curve 3 of FIG. 2. The light from the lamp 2 is directed through a linear polarizer 4, such as a calcite or quartz Glan-Taylor prism, into a sample cell 5, such as a stainless steel bobbin of 0.5 inch inside diameter and 4.0 inch in length, having quartz windows 6 and 7 closing off opposite ends of the cell 5. Fluid to be analyzed, such as gas or liquid, is fed through the cell 5 via input line 8 and output line 9. A magnetic solenoid 11 is wound on the bobbin for producing a relatively strong axial magnetic field H having a strong component directed parallel to the path of the light beam passing through the sample cell 5.

The action of the magnetic field H on the magneto-optically active molecules or atoms within the sample fluid being analyzed is to rotate the polarization of the light such that a small fraction of the light is rotated 90° relative to the linear polarization of the light beam incident on the sample. The light which is rotated by the sample constituents is found to have occurred at different wavelengths across the spectral profile of the lamp. For example, in FIG. 2 curve 12 depicts the lamp profile less those components of the light beam which are rotated by 90° due to passing through the sample constituents consisting of NO, $SO_2$, $CH_2O$ and $NO_2$. The spectral profiles for the various components of light which have been rotated by 90° are indicated by curves 13, 14, 15 and 16 of FIG. 2.

The light beam containing the rotated components is passed through a second linear polarizer 17 serving as a polarization analyzer. The linear polarizer 17 is oriented with the direction of polarization oriented 90° relative to the orientation of the input linear polarizer 4. The polarization analyzer 17, which is essentially identical to the first linear polarizer 4, serves to separate light components 20 which have been rotated by 90° relative to those components 21 which have not been rotated. Thus, the output beam 20 of the linear polarizer 17 is passed to a photo-multiplier detector 19. Beam 20 consists of the rotated components similar to those indicated by curves 13–16 in FIG. 2. On the other hand, the polarization analyzer 17 directs the remaining lamp profile light, as indicated by curve 12 of FIG. 2, into a second output beam 21. Either one of the output beams 20 and 21 contains essentially the same information, however, beam 20 has improved signal to noise ratio.

Figure 3:
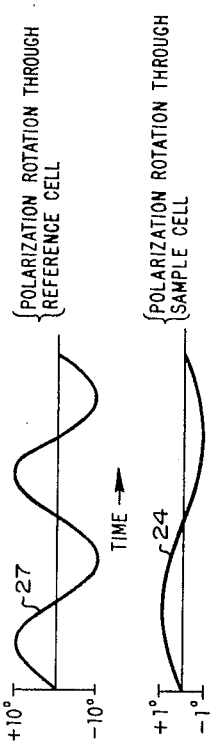
FIG. 3 shows polarization rotation as a function of time for three different quantities, namely polarization rotation through the reference cell, polarization rotation through the sample cell, and the combined polarization rotation through the reference and sample cell.

The solenoid 11 for producing the axially directed magnetic field H in the sample cell 5 is driven from the output of a power oscillator 23 having a frequency $\omega_1$. This produces a corresponding variation in the magneto-optic rotation of the light by magneto-optically active constituents within the sample cell 5 within bands of light corresponding to the magneto-optic rotation spectra of FIG. 2. The sample polarization rotation produced by the alternating magnetic field of frequency $\omega_1$ is shown by curve 24 of FIG. 3. This shows that the polarization rotation by the sample constituents varies between +1° and −1° at the alternating frequency $\omega_1$.

A reference modulator 25 is also disposed in the optical beam path for producing a reference rotation of the polarization of the light passing through the reference polarization rotator 25. Reference rotator 25 may take any one of a number of different forms. For example, it may comprise an acousto-optic filter of the type disclosed in an article titled "Acousto-Optic Tunable Filter" appearing in the Journal of the Optical Society of America, Vol. 59, No. 6, pp. 744–747, and tuned for the center frequency of the magneto-optic rotation spectrum of the sample constituent under analysis.

In a preferred embodiment, the reference rotator 25 comprises a reference cell, similar to cell 5, containing a reference magneto-optically active constituent or medium corresponding to a particular sample constituent to be analyzed. The cell is immersed in a reference axial magnetic field to produce a reference magneto-optic rotation of the polarization of the light within a band of frequencies corresponding to a particular spectrum within the sample cell to be analyzed. More particularly, if it is desired to detect the NO constituent within the sample cell 5, the reference rotator cell 25 would be filled with NO as the magneto-optically active medium.

In a preferred embodiment, the reference polarization rotator 25 is modulated at a second modulation frequency $\omega_2$ by means of an output derived from an $\omega_2$ power oscillator 26 and fed to modulate the magnetic field of a magneto-optically active reference rotator cell 25 or to the tuning input terminal of an electrically variable acousto optic filter element, as the case may be. Assuming the reference modulation frequency $\omega_2$ is twice the sample modulation frequency $\omega_1$, the reference rotator 25 will produce a reference modulation of the polarization rotation of the light as indicated by waveform 27 of FIG. 3. The combined reference modulation and sample modulation of the polarization rotation has a complex waveform as indicated by curve 28 of FIG. 3. This waveform upon analysis by polarization analyzer 17 contains components at $2\omega_1$ and $2\omega_2$ and sideband components at $(\omega_1 + \omega_2)$ and $(\omega_1 - \omega_2)$. A mathematical expression for these analyzed signal components is given by the following expression:

$$I_0 \left\{ \frac{K^2 C_2^2 H_2^2 (1 - \cos 2\omega_2 t)}{2} + \frac{K^2 C_1^2 H_1^2 (1 - \cos 2\omega_1 t)}{2} \right.$$
$$\left. + K^2 C_1 C_2 H_1 H_2 \left[ \cos (\omega_1 - \omega_2)t - \cos (\omega_1 + \omega_2)t \right] \right\}$$

Eq. (1)

Where K is a constant, $C_2$ is concentration of the reference medium, $C_1$ is the concentration of the sample medium within the detected optical bandwidth, $H_1$, and $H_2$ are the peak magnetic field intensities in the respective sample and reference cells, $I_0$ is the input light intensity, and t is time.

From Eq. (1) it is seen that the amplitude of each of the sideband components is linearly related to the concentration of a magneto-optically active constituent or constituents within the sample cell 5 and within the band of light detected, whereas the amplitudes of the harmonic signals $2\omega_1$ and $2\omega_2$ are not linearly related to the concentration of the particular constituent within the sample cell under analysis. Therefore, it is desirable, in order to reduce the complexity of the calibration of the analyzer, to detect the sideband components.

Accordingly, samples of the electrical outputs from the $\omega_1$ oscillator 23 and $\omega_2$ oscillator 26 are combined in a sideband generator 29 to produce sideband components which are thence fed to one input of a synchronous detector 31 for synchronously detecting the output of the photo-detector 19. The separated sideband component or components are dc signals which are fed through a filter 32 for removing any a.c. components therein and/or for integrating the output which is thence fed to the display 33 for measuring and displaying the quantity of concentration of the magneto-optically active constituent or constituents within the sample cell 5.

The sideband generator 29 need not comprise a conventional sideband generator, as indicated in FIG. 1, but may comprise a signal generator that generates both frequencies $\omega_1$ and $\omega_2$, thereby replacing oscillators 23 and 26. In addition it would generate a sideband or sidebands of the two frequencies $\omega_1$ and $\omega_2$ for synchronizing the synchronous detector 31. Thus, in the broadest sense, the sideband generator 29 comprises merely a synchronizer for synchronizing the synchronous detector 31. The sideband generator 29 need not generate sinusoidal output signals but may comprise merely a pulse generator for pulsing the reference and sample polarization rotations and for producing a pulse train output at a sideband pulse repetition rate of the reference and sample pulse rates for synchronizing the synchronous detector 31.

The synchronous detector 31 may comprise an up-down counter, a synchronous switch, or a phase sensitive detector. In a preferred embodiment, the synchronous detector 31 comprises an up-down counter which counts up (in one direction) during the time the particular sideband component is at a maximum in the output of the photo-detector 19 and counts down (in the opposite direction) for an equal amount of time during the time that the sideband component has a minimum amplitude. In this manner, the noise is subtracted from the signal. The system of FIG. 1 is useful over the range of concentration for the sample constituents from $10^{-3}$ to $10^{-7}$. In the relatively low concentration range i.e., $10^{-7}$, a relatively large background of noise pulses is produced in the output of the photomultiplier 19 and the signal which it is desired to detect can be much smaller than the noise. For example, approximately $10^4$ spurious pulses per second are produced in the output of the photomultiplier 19, whereas the signal may produce only approximately 100 pulses per second. Thus, it is seen that the signal is about two orders of magnitude lower in intensity than the noise out of which it must be detected.

The output of photomultiplier 19 comprises a series of pulses with pulse widths of approximately 5 nanoseconds each and with a repetition rate varying from the low end of the range to the high end of the range from $10^4$ to 100 MHz. The pulses from the output of the photo-multiplier 19 are fed to a pulse amplifier, not shown, wherein they are amplified. The pulse amplifier preferably has a relatively wideband for amplifying the relatively short pulses and, in addition, has a log type gain characteristic such that low intensity pulses are amplified considerably more than high intensity pulses. In this manner, the output pulses are of relatively constant amplitude for counting in the up-down counter as employed for the synchronous detector 31.

As the count is accumulated, the signal is automatically thereby integrated. After a predetermined duration of the count, the output of the counter is fed to a transfer and buffer storage, not shown, and thence displayed on a digital display 33 to yield a measure of the concentration of a selected constituent in the sample cell 5. In the absence of a selective optical filter in the light path between the lamp 2 and photodetector 19, which selects only a certain portion of the spectral profile of the lamp 3, all of the magneto-optically active sample constituents will be measured by the analyzer 1 and displayed at 33. A very high degree of specificity is obtained for a particular sample constituent if that particular constituent is utilized as the reference magneto-optically active medium in a magneto-optic type reference polarization rotator 25. The advantage to the analyzer 1 of FIG. 1 is that the output signal is more readily calibrated since the output is linearly related to the concentration of the particular sample constituent within the cell 5. In addition, the analyzer has increased sensitivity compared to the harmonic detection system.

In Eq. (1) above, either one of the polarization rotation frequencies $\omega_1$ or $\omega_2$ may be 0, i.e. a dc polarization rotation. Thus, the analyzer of FIG. 1 can be substantially simplified by utilizing a permanent magnet or dc solenoid for producing a dc magnetic field within the sample cell 5 or within the reference rotator 25 if a magneto-optically active medium is employed. As an alternative, a fixed polarization rotator may be employed or the output analyzer 17 rotated out of 90° relation to the input polarizer 4 such as by 45° to produce the dc reference rotation of polarization. The sideband generator 29 can then be eliminated since the sideband is merely the non-zero modulation frequency, $\omega_1$ or $\omega_2$ as the case may be. A sample of this modulation frequency is fed to the reference input of the synchronous detector 31 for synchronously detecting the output of the photodetector 19.

Thus, use of a zero modulation frequency $\omega_1$ or $\omega_2$ substantially simplifies the apparatus of the analyzer 1. However, a loss of sensitivity is obtained because such a dc rotation of the polarization cannot be distinguished from a slight misalignment of the input polarizer 4 with the output polarization analyzer 17. Such slight misalignments introduce an unwanted signal in the output of the synchronous detector 31. On the other hand, such a simplified analyzer 1 is useful for detecting sample constituent concentrations as low as $10^{-6}$. Sensitivities less than $10^{-6}$ are preferably measured in an analyzer 1 employing non-zero sample and reference rotation modulation frequencies $\omega_1$ and $\omega_2$.

Figure 4:
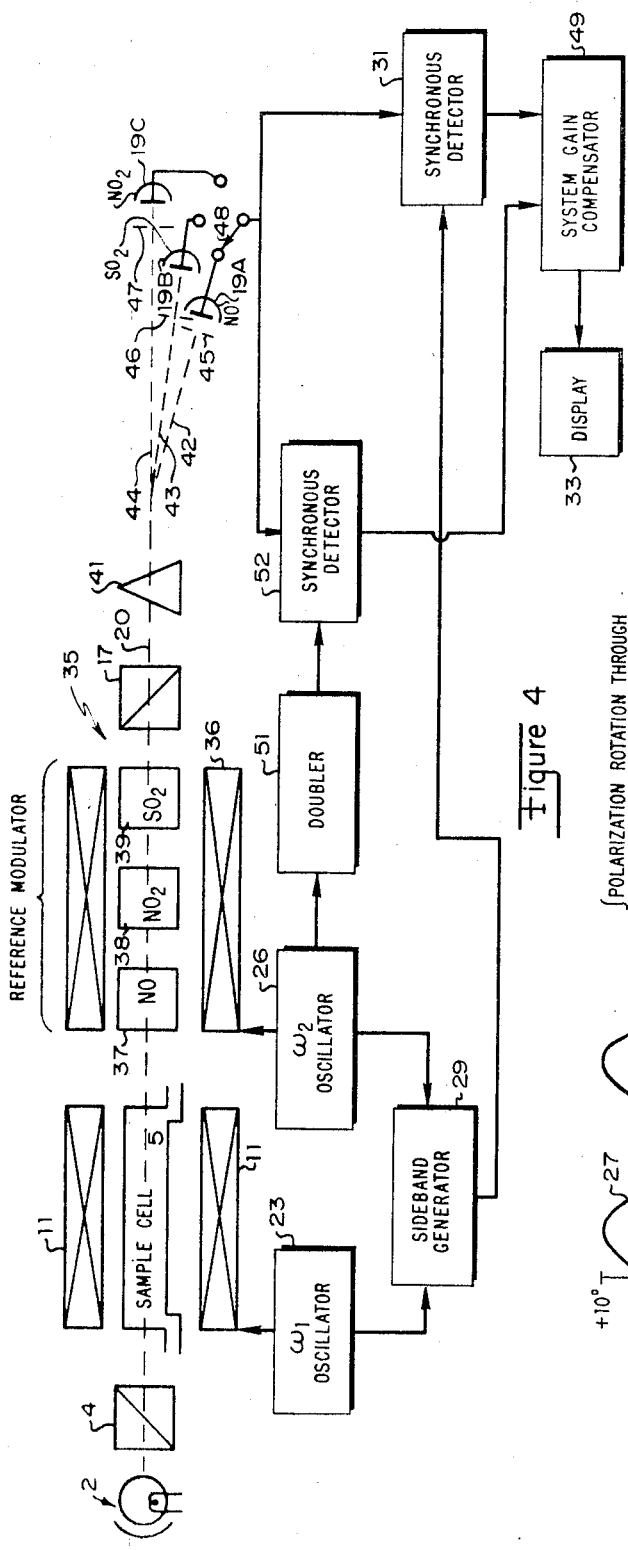
FIG. 4 is a schematic line diagram, partly in block diagram form, depicting a magneto-optic rotation analy

Referring now to FIG. 4, there is shown an analyzer 35 incorporating alternative features of the present invention. More particularly, the system of FIG. 4 is substantially the same as that previously described with regard to FIG. 1, with the exception that the reference rotation modulator 25 includes a plurality of different magneto-optically active reference media within a common magnetic field produced by a solenoid 36. The reference media are placed within separate cells 37, 38 and 39. In addition, the analyzer 35 has been modified to include an automatic system gain compensator for compensating for variations in the components of the analyzer 35. Although the reference media are shown to be provided in separate cells 37–39, this is not a requirement as they may be placed in a common cell provided that they do not interact with each other. The solenoid 36 produces a magnetic field H parallel to the optical beam within each of the respective reference cells 37–39 to produce reference magneto-optic rotation of the beam at the corresponding optical wavelengths according to the magneto-optic rotation spectra for the respective reference media. The reference magneto-optic rotation is modulated at a frequency $\omega_2$ supplied from the $\omega_2$ oscillator 26, in the manner as previously described with regard to FIG. 1.

The polarization analyzed output beam 20 is fed through a prism or grating 41 for spacially separating the output beam 20 into separate beams 42, 43 and 44 corresponding to different wavelengths or bands of wavelengths within the lamp profile. A plurality of analyzer slits 45, 46 and 47 are provided for passing the spacially separated beams 42, 43 and 44 to separate photodetectors 19A, 19B and 19C, respectively.

A switch 48 is provided for selecting a particular output of the detectors 19A–19C. The sideband output signal from the output of the selected photodetector 19 is synchronously detected by synchronous detector 31 against a reference from the output of the sideband generator 29 to separate the sideband output signal for measurement thereof. The output of the synchronous detector 31, in the case of an up-down counter, comprises a measure of the particular sideband signal which is to be displayed on display 33. In other cases, the output signal from the synchronous detector 31 may have to be integrated to obtain a signal for display.

A system gain compensator 49 is provided for compensating for variations in the optical and electrical transmission parameters of the analyzer 35. Such a system gain compensator is described and claimed in copending U.S. Patent Application Ser. No. 161,846, filed July 12, 1971, and assigned to the same assignee as the present invention and, therefore will be only briefly described herein. The system gain compensator 49 uses the reference modulation output signal in the output of the photodetector 19 for comparison against a reference quantity to derive a gain compensating error signal which is employed for determining the length of integration or length of counting of the signal under measurement to compensate for the variations in the transmission characteristics of elements within the analyzer 35.

More particularly, a sample of the output of the $\omega_2$ reference oscillator 26 is fed to a doubler 51 for doubling and thence fed to one input of a synchronous detector 52 which may take any one of the forms of the synchronous detector 31 previously described. The reference synchronous detector 52 synchronously detects the reference modulation output signal to derive an output signal independent of variations in the sample cell 5. This reference output signal is divided into the sideband signal in the gain compensator 49 to normalize the gain of the analyzer, thereby compensating for variations in parameters of the analyzer 35.

The advantage to the analyzer 35 in FIG. 4 is that the quantity of various different constituents within the sample cell 5 may be readily measured by switching switch 48 to successively different ones of the detectors 19A–19C. As an alternative, only one photodetector need be provided, such detector and its associated slit being rotatable about the prism 41 for successively detecting different optical bands determined by the width of the slit and the angular position of the detector and slit relative to the prism 41. In still another embodiment, the detector 19 and slit may be stationary and the prism 41 rotated to rotate successive optical bands of the analyzed and spacially separated probing beam 20 into the slit and detector 19.

Figure 5:
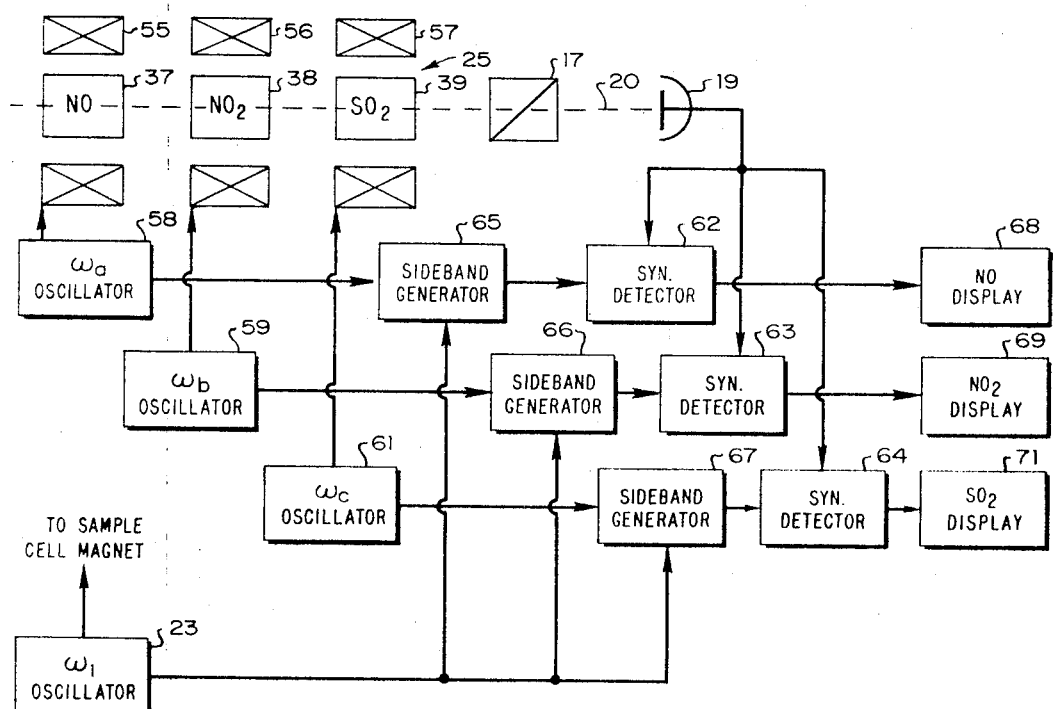
- FIG. 5 is a schematic line diagram, partly in block diagram form, depicting an alternative embodiment of that portion of the structure of FIG. 1 delineated by a line 5—5.

Referring now to FIG. 5 there is shown an alternative embodiment to that portion of the structure of FIG. 1 delineated by line 5—5. More particularly, the reference polarization modulator 25 includes a plurality of separate reference cells 37–39, as previously described with regard to FIG. 4, each reference cell having its own separate associated solenoid 55, 56 and 57, respectively, for producing a respective magnetic field within the respective reference cells 37–39. Each solenoid 55–57 is driven at a separate reference modulation frequency $\omega_a$, $\omega_b$ and $\omega_c$, respectively, derived from reference oscillators 58, 59 and 61, respectively.

Thus, the reference modulator 25 produces a plurality of different sideband components simultaneously in the output of the photodetector 19. These simultaneous sideband signal components are separately synchronously detected by synchronous detectors 62, 63 and 64 against respective sideband reference signals derived from side-band generators 65, 66 and 67, respectively. The sideband generators 65–67 combine the reference signals $\omega_a$, $\omega_b$ and $\omega_c$ with a sample of the sample modulation frequency $\omega_1$ to produce the respective sideband references fed to the respective synchronous detectors 62–64.

The output of the respective synchronous detectors 62–64 are fed to respective displays 68–71 for displaying the quantity of the respective sample constituent within the sample cell 5 corresponding to the respective reference magneto-optically active medium. The advantage to the embodiment of FIG. 5 is that a simultaneous measurement and display of the various separate sample constituents is obtained.

Figure 6:
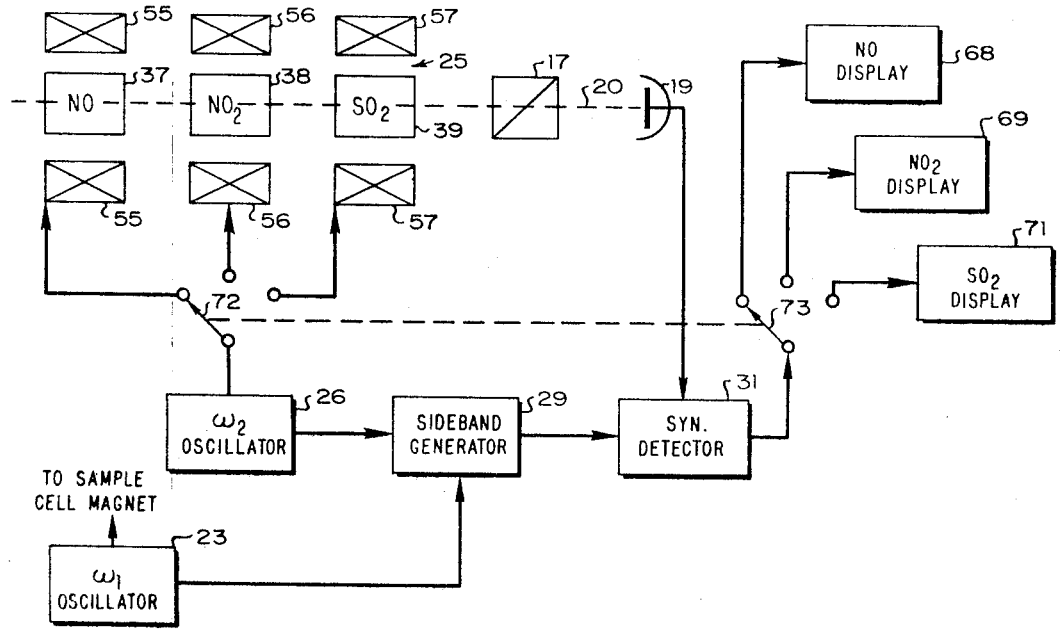
FIG. 6 is a schematic line diagram, partly in block diagram form, depicting an alternative embodiment of that portion of the structure of FIG. 1 delineated by line 6—6.

Referring now to FIG. 6 there is shown an alternative embodiment to that portion of the structure of FIG. 1 delineated by line 6—6. The structure of FIG. 6 is substantially similar to that of FIG. 5 with the exception that the reference modulator 25 is sequentially energized as opposed to being simultaneously energized. For this purpose a switch 72 is provided for sequentially switching the output of the reference oscillator 26 to respective ones 55–57 of the solenoids surrounding respective ones of the sample reference media 37–39 to obtain sequential reference magneto-optic rotation of the probing light beam. Switch 72 is ganged with a second switch 73 for correlating modulation of the respective magneto-optically active reference medium with its respective display 68–71. As an alternative, only a single display need be provided and switch 73 can be eliminated with means interconnecting switch 72 and the display for correlating a respective one of the reference magneto-optically active media with the display.

What is claimed is:

1. In a method for analyzing a sample by detection of magneto-optic rotation the steps of, disposing a sample of matter to be analyzed to receive a probing light beam having a first polarization and a preselected direction of propogation, applying a magnetic field to the sample with a substantial component of the applied magnetic field being directed along the direction of propagation of the probing light beam within the sample to produce magneto-optic rotation of the polarization of the light by the sample from the first polarization to a second polarization, producing independently of the sample a reference rotation of the polarization of the polarized probing light beam from the first to the second polarization, analyzing the polarization of the probing light beam to separate probing light of the first polarization from probing light of the second polarization, modulating the magneto-optic sample rotation of the polarization at a first non-zero modulation frequency, modulating the reference rotation of the polarization at a second non-zero frequency, detecting the separated light of one of the first and second polarizations to obtain a composite electrical output signal having a time-varying electrical signal component of a sideband frequency corresponding to a sideband of the sample polarization rotation frequency and the reference polarization rotation frequency, and of an amplitude which is responsive to the quantity of material within the sample which is magneto-optically active within a band of optical frequencies of the probing light incident on the sample, separating the electrical signal component of the sideband frequency from the composite electrical output signal to produce a sideband electrical output signal, and measuring the amplitude of the sideband electrical output signal to obtain a measure of the quantity of material within the sample which is magneto-optically active.

2. The method of claim 1 wherein the step of separating the sideband electrical output signal includes the step of synchronously detecting the composite electrical output signal against a reference signal having a frequency which is a preselected function of said sideband frequency.

3. The method of claim 1 wherein the step of producing a reference rotation of the polarization of the polarized probing light beam includes the step of, passing the polarized light beam through a reference magneto-optically active medium which is the same as that of at least one component of the sample material to be analyzed, and applying a magnetic field to the reference medium to produce the reference rotation of the polarization of the probing light beam.

4. The method of claim 3 wherein the reference magneto-optically active medium comprises a plurality of different reference media disposed along the probing light beam, each of said reference mediums comprising a material to be analyzed within the sample.

5. The method of claim 4 including the step of diffracting the polarization analyzed light beam to spatially separate the polarization analyzed probing light beam into a plurality of separate light beams, each of said separate light beams having a particular band of optical frequencies corresponding to a particular magneto-optic rotation spectral band for different ones of said reference media.

6. The method of claim 4 wherein the step of applying the magnetic field to said reference media comprises the step of applying the magnetic field sequentially to the different ones of said reference mediums to obtain a sequential reference rotation of the polarization of the probing light beam in different bands of optical frequencies.

7. The method of claim 4 wherein the step of applying the magnetic field to said reference media comprises the step of, applying the magnetic field to the different ones of said reference media simultaneously to obtain simultaneous reference rotation of the polarization of the probing light beam within different optical bands corresponding to different reference magneto-optic rotation spectra characteristic of the different reference media.

8. The method of claim 7 including the step of, modulating the magnetic field applied to the different ones of said reference media at different modulation frequencies to produce a plurality of sideband electrical output signals simultaneously at different sideband frequencies in the composite electrical output signal detected at the output of the probing light beam detector.

9. The method of claim 8 including the steps of, separating the plurality of sideband electrical signals and measuring each of the sideband electrical signals to give a measure of the quantity of the particular reference material in the sample under analysis.

10. In a magneto-optic rotation analyzer, means for probing a sample of matter to be analyzed with a probing light beam having a first polarization and a preselected direction of propogation, means for applying a magnetic field to the sample with a substantial component of said field being directed along the direction of propogation of the probing light beam in the sample to produce magneto-optic sample rotation of the polarization of the light from the first polarization to a second polarization, means for producing independently of the sample a reference rotation of the polarization of the polarized probing light beam from the first to the second polarization, means for analyzing the polarization of the probing light beam to separate probing light of the first polarization from probing light of the second polarization, means for modulating the magneto-optic sample rotation of the polarization at a first non-zero modulation frequency, means for modulating the reference rotation of the polarization at a second non-zero frequency, means for detecting the separated light of one of said polarizations to obtain a composite electrical output signal having a time varying electrical signal component of a sideband frequency corresponding to a sideband of the sample polarization rotation frequency and the reference polarization rotation frequency and of an amplitude which is a function of the quantity of material within the sample which is magneto-optically active within the band of optical frequencies of the probing light incident on the sample, means for separating the electrical signal component of the sideband frequency from the composite electrical output signal to produce a sideband electrical output signal, and means for measuring the amplitude of the sideband electrical output signal to obtain a measure of the quantity of material within the sample which is magneto-optically active.

11. The apparatus of claim 10 wherein said means for separating the sideband electrical signal includes, means for synchronously detecting the composite electrical output signal against a reference signal having a frequency which is a preselected function of the sideband frequency.

12. The apparatus of claim 10 wherein said means for producing a reference rotation of the polarization of the polarized probing light beam includes, means for disposing a reference magneto-optically active medium which is the same as that of at least one component of the sample material to be analyzed in the polarizing light beam, and means for applying a magnetic field to the reference medium to produce the reference rotation of the polarization of the probing light beam.

13. The apparatus of claim 12 wherein said means for disposing the reference magneto-optically active medium in the path of the light beam includes a plurality of reference cell means disposed along the probing light beam, each of said cell means including a different reference medium corresponding to a respective constituent of the sample to be analyzed.

14. The apparatus of claim 12 wherein the reference medium includes a plurality of different reference media, and including, means for diffracting the polarization analyzed light beam to spatially separate the polarization analyzed light beam into a plurality of separate light beams, each of said separate light beams having a particular band of optical frequencies corresponding to a particular magneto-optic rotation spectral band for different ones of said reference media.

15. The apparatus of claim 12 wherein the reference medium comprises a plurality of different reference mediums corresponding to different constituents of the sample material to be analyzed, and wherein said means for applying the magnetic field to said reference media comprises, means for applying the magnetic field sequentially to said different ones of said reference media to obtain a sequential reference rotation of the polarization of the probing light beam.

16. The apparatus of claim 12 wherein said reference medium comprises a plurality of different reference media, and wherein said means for applying the magnetic field comprises, means for applying the magnetic field to the different ones of said reference media simultaneously to obtain simultaneous reference rotation of the polarization of the probing light beam within different optical bands corresponding to different reference magneto-optic rotation spectra characteristic of the different reference media.

17. The apparatus of claim 16 including means for modulating the magnetic field applied to the respective reference media at respectively different modulation frequencies to produce electrical output signals simultaneously at different sideband frequencies in the composite electrical output signal detected at the output of said probing light beam detector means.

* * * * *